United States Patent
Ryu (10) Patent No.: US 12,060,040 B2
(45) Date of Patent: Aug. 13, 2024

(54) CONTROL SYSTEM AND CONTROL METHOD OF A WIPER FOR A VEHICLE USING THE SAME

(71) Applicant: HYUNDAI AUTOEVER CORP., Seoul (KR)

(72) Inventor: Kyung Soo Ryu, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 276 days.

(21) Appl. No.: 17/534,024

(22) Filed: Nov. 23, 2021

(65) Prior Publication Data

US 2022/0185239 A1      Jun. 16, 2022

(30) Foreign Application Priority Data

Dec. 16, 2020   (KR) .................. 10-2020-0176506

(51) Int. Cl.
*B60S 1/08*      (2006.01)
*B60S 1/04*      (2006.01)

(52) U.S. Cl.
CPC ........... *B60S 1/0807* (2013.01); *B60S 1/0469* (2013.01)

(58) Field of Classification Search
CPC ........ B60S 1/08; B60S 1/0807; B60S 1/0452; B60S 1/0469
USPC ........................................................ 318/443
See application file for complete search history.

(56) References Cited

U.S. PATENT DOCUMENTS

| | | | |
|---|---|---|---|
| 4,309,646 A * | 1/1982 | Liedtke | B60S 1/08 318/443 |
| 4,585,980 A * | 4/1986 | Gille | B60S 1/0814 15/250.16 |
| 5,559,410 A * | 9/1996 | Papazian | B60S 1/08 318/443 |
| 5,907,885 A | 6/1999 | Tilli et al. | |
| 6,242,876 B1 * | 6/2001 | Thompson | B60S 1/0807 318/444 |

(Continued)

FOREIGN PATENT DOCUMENTS

| | | |
|---|---|---|
| CN | 106061807 A | 10/2016 |
| CN | 107985263 A | 5/2018 |

(Continued)

OTHER PUBLICATIONS

Office Action cited in corresponding Korean patent application No. KR10-2020-0176506; Mar. 18, 2022; 10 pp.

(Continued)

*Primary Examiner* — Gabriel Agared
(74) *Attorney, Agent, or Firm* — Lempia Summerfield Katz LLC (57) ABSTRACT

Provided are a control system of a wiper for a vehicle and a control method of the wiper for the vehicle using the same, which are capable of extending a life-span of the wiper by controlling a parking position of a unidirectional wiper. The control method includes: counting parking times at a first parking position and a second parking position of the wiper; determining whether the parking time at the first parking position of the wiper exceeds the parking time at the second parking position; and designating a parking position of the wiper according to whether the parking time at the first parking position of the wiper exceeds the parking time at the second parking position.

13 Claims, 4 Drawing Sheets

(56) References Cited

U.S. PATENT DOCUMENTS

| | | | | |
|---|---|---|---|---|
| 6,306,220 B1* | 10/2001 | Zimmer | ................ | B60S 1/0455 |
| | | | | 318/285 |
| 10,005,430 B2 | 6/2018 | Ikeda | | |
| 2002/0163318 A1* | 11/2002 | Iredale | ...................... | B60S 1/08 |
| | | | | 318/483 |
| 2013/0124011 A1* | 5/2013 | Kwon | ................... | B60S 1/0807 |
| | | | | 701/2 |
| 2017/0158172 A1 | 6/2017 | Ikeda | | |
| 2017/0313284 A1* | 11/2017 | Koike | ................... | B60S 1/0461 |
| 2018/0370491 A1* | 12/2018 | Brown | .................. | B64C 1/1484 |
| 2019/0118775 A1* | 4/2019 | Koberstaedt | .............. | B60S 1/08 |

FOREIGN PATENT DOCUMENTS

| | | |
|---|---|---|
| CN | 110015267 A | 7/2019 |
| DE | 10317532 A1 | 5/2004 |
| DE | 102019003672 A1 | 11/2020 |
| JP | 2005349850 A | 12/2005 |
| KR | 20010022043 A | 3/2001 |
| KR | 20050111816 A | 11/2005 |
| KR | 20130053066 A | 5/2013 |

OTHER PUBLICATIONS

Office Action cited in Chinese patent application No. 202111449898.7; Apr. 6, 2023; 24 pp.

\* cited by examiner

CONTROL SYSTEM AND CONTROL METHOD OF A WIPER FOR A VEHICLE USING THE SAME

CROSS-REFERENCE TO RELATED APPLICATIONS

This application claims priority to and the benefit of Korean Patent Application No. 10-2020-0176506, filed on Dec. 16, 2020, the entire contents of which are incorporated herein by reference.

FIELD

The present disclosure relates to a control system of a wiper for a vehicle and a control method of a wiper for a vehicle using the same, which are capable of extending a life-span of the wiper.

BACKGROUND

The statements in this section merely provide background information related to the present disclosure and may not constitute prior art.

In general, one of the important factors which should be considered for safe driving of a vehicle is clear front and rear views secured for a driver.

To this end, a general vehicle has a wiper device that removes foreign materials attached onto a front glass surface and wipes rainwater on the front glass surface in case of rain.

The wiper device has a structure in which rotational driving force generated from a wiper motor is transferred to a pivot mechanism and a wiper arm through a wiper linkage system, and as a result, when the wiper arm reciprocates horizontally, a blade assembly provided in the wiper arm moves in a predetermined wiping section to wipe a front glass.

Such a conventional wiper device may be divided into a bidirectional wiper in which the wiper motor is rotatable bidirectionally and a unidirectional wiper in which the wiper motor is rotatable unidirectionally.

The unidirectional wiper is repeatedly stopped at the same position as a wiper stop position is fixed and performs a wiping function by adjusting a speed according to a state of a wiper operation switch, and stops the wiper at a stop position when the wiper operation switch is turned off during a wiping operation.

In the case of the unidirectional wiper in the related art, we have discovered that the wiper stop position is not controlled and the unidirectional wiper is repeatedly stopped at the same position, as a result, rubber transformation of the wiper is in progress only in the same direction and hardening is fast and a life-span is shortened.

SUMMARY

The present disclosure provides a control system of a wiper for a vehicle and a control method of the wiper for the vehicle using the same, which are capable of extending a life-span of the wiper by controlling a parking position of a unidirectional wiper.

In one form of the present disclosure, a control method of a wiper for a vehicle includes: counting parking times at a first parking position and a second parking position of the wiper; checking whether the parking time at the first parking position of the wiper exceeds the parking time at the second parking position; and designating a parking position of the wiper according to whether the parking time at the first parking position of the wiper exceeds the parking time at the second parking position.

In one form, the wiper is a unidirectional driving wiper.

In another form, the counting of the parking times at the first parking position and the second parking position of the wiper includes counting the parking time at the second parking position of the wiper until the wiper is operated, and operating the wiper.

In one form of the present disclosure, the counting of the parking times at the first parking position and the second parking position of the wiper further includes parking the wiper at the first parking position after the operation of the wiper is completed, and counting the parking time at the first parking position of the wiper.

In one form of the present disclosure, the designating of the parking position of the wiper includes parking the wiper at the second parking position by operating the wiper when the parking time at the first parking position of the wiper exceeds the parking time at the second parking position.

In one form of the present disclosure, the designating of the parking position of the wiper includes parking the wiper at the first parking position when the parking time at the first parking position of the wiper does not exceed the parking time at the second parking position.

In one form of the present disclosure, in the designating of the parking position of the wiper, the parking position of the wiper is designated so that the parking time at the first parking position of the wiper and the parking time at the second parking position are identical.

In one form of the present disclosure, when the wiper performs a wiping operation, the wiper is movable from the second parking position to the first parking position, and when the wiper does not perform the wiping operation, the wiper does not move from the second parking position to the first parking position.

In one form of the present disclosure, when the wiper does not perform the wiping operation, if the wiper is parked at the first parking position, the wiper is movable from the first parking position to the second parking position.

Another exemplary form of the present disclosure provides a control system of a wiper for a vehicle, which includes: a counter unit counting parking times at a first parking position and a second parking position of the wiper; a wiper motor unit operating the wiper; and a wiper motor control unit controlling the operation of the wiper motor unit, in which the wiper motor control unit controls the operation of the wiper motor unit so as to designate a parking position of the wiper according to the parking times at the first parking position and the second parking position counted by the counter unit.

In one form of the present disclosure, the wiper motor unit is a unidirectional rotation motor which rotates only in one direction.

In one form of the present disclosure, the counter unit counts the parking time at the second parking position of the wiper until the wiper is operated and the parking time at the first parking position of the wiper after the operation of the wiper is completed.

In one form of the present disclosure, the wiper motor control unit controls the operation of the wiper motor unit so as to park the wiper at the second parking position when the parking time at the first parking position of the wiper exceeds the parking time at the second parking position.

In one form of the present disclosure, wiper motor control unit controls the operation of the wiper motor unit so as to park the wiper at the first parking position when the parking time at the first parking position of the wiper does not exceed the parking time at the second parking position.

In one form of the present disclosure, the wiper motor control unit designates the parking position of the wiper by controlling the operation of the wiper motor unit so that the parking time at the first parking position of the wiper and the parking time at the second parking position are identical.

In one form of the present disclosure, when the wiper performs a wiping operation, the wiper is movable from the second parking position to the first parking position, and when the wiper does not perform the wiping operation, the wiper does not move from the second parking position to the first parking position.

In one form of the present disclosure, when the wiper does not perform a wiping operation, if the wiper is parked at the first parking position, the wiper is movable from the first parking position to the second parking position according to a control of the wiper motor control unit.

According to an exemplary form of the present disclosure, since a parking position of a wiper is designated so that parking times at a first parking position and a second parking position of the wiper counted by a counter unit are identical, a life-span of the wiper can be extended by minimizing hardening of rubber of the wiper.

The foregoing summary is illustrative only and is not intended to be in any way limiting. In addition to the illustrative aspects, forms, and features described above, further aspects, forms, and features would become apparent by reference to the drawings and the following detailed description.

BRIEF DESCRIPTION OF THE DRAWINGS

In order that the disclosure may be well understood, there will now be described various forms thereof, given by way of example, reference being made to the accompanying drawings, in which.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes are determined in part by the particular intended application and use environment.

In the figures, reference numbers refer to the same or equivalent parts of the present disclosure throughout the several figures of the drawing.

DETAILED DESCRIPTION

Hereinafter, some forms of the present disclosure are described in detail with reference to the accompanying drawings. First, when reference numerals refer to components of each drawing, it is to be noted that although the same components are illustrated in different drawings, the same components are denoted by the same reference numerals as possible. Further, in describing the present disclosure, a detailed description of known related configurations and functions may be omitted to avoid unnecessarily obscuring the subject matter of the present disclosure. Further, hereinafter, some forms of the present disclosure are described, but the technical spirit of the present disclosure is not limited thereto or restricted thereby and the forms can be modified and variously executed by those having ordinary skill in the art.

When a component, device, element, or the like of the present disclosure is described as having a purpose or performing an operation, function, or the like, the component, device, or element should be considered herein as being "configured to" meet that purpose or to perform that operation or function.

Also, the terms, such as 'unit' or 'module', etc., should be understood as a unit that processes at least one function or operation and that may be embodied in a hardware manner (e.g., a processor), a software manner, or a combination of the hardware manner and the software manner.

Figure 1:
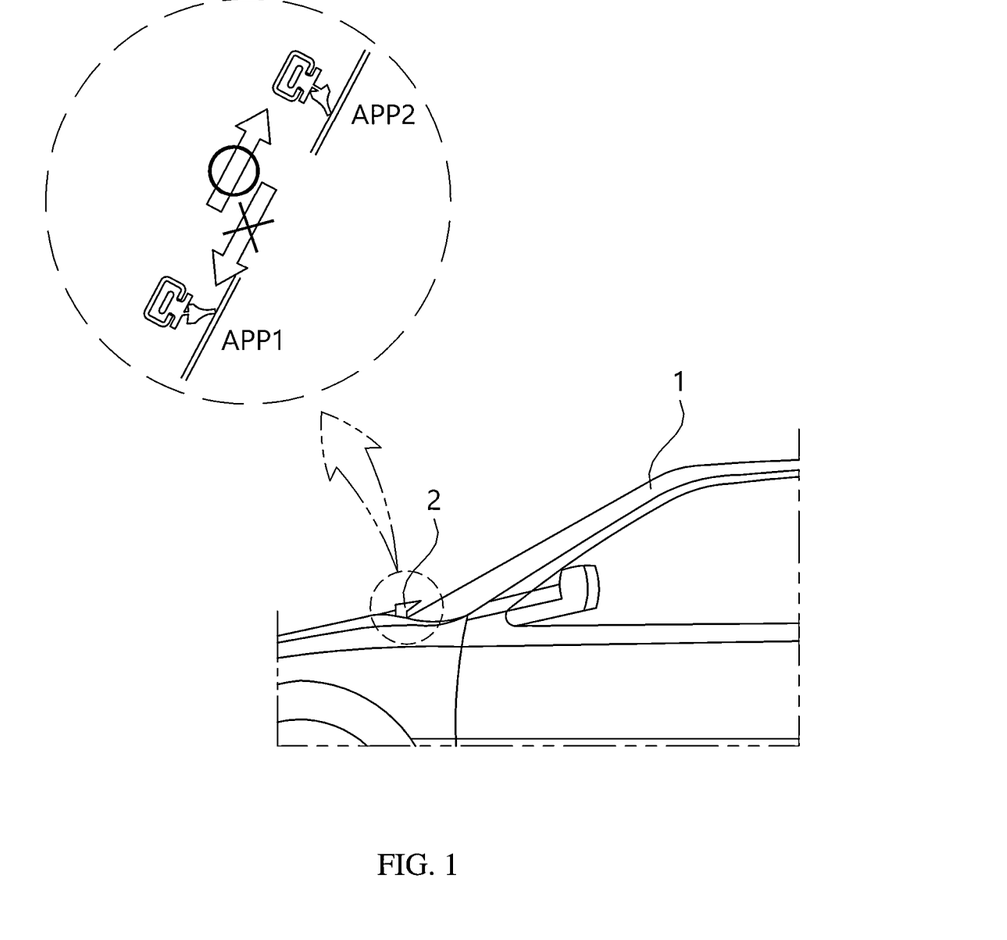
FIG. 1 is a diagram illustrating a wiper for a vehicle according to an exemplary form of the present disclosure.

FIG. 1 is a diagram illustrating a wiper for a vehicle according to an exemplary form of the present disclosure.

Referring to FIG. 1, a wiper 2 may be mounted on a front glass of a vehicle 1.

In this case, when a wiping operation of the wiper 2 is performed, a parking position of the wiper 2 is changeable from a first parking position APP1 to a second parking position APP2 or from the second parking position APP2 to the first parking position APP1. However, when the wiping operation of the wiper 2 is not performed, the wiper 2 becomes a unidirectionally driven wiper. Namely, for example, the wiper 2 cannot change the parking position from the second parking position APP2 to the first parking position APP1.

Figure 2:
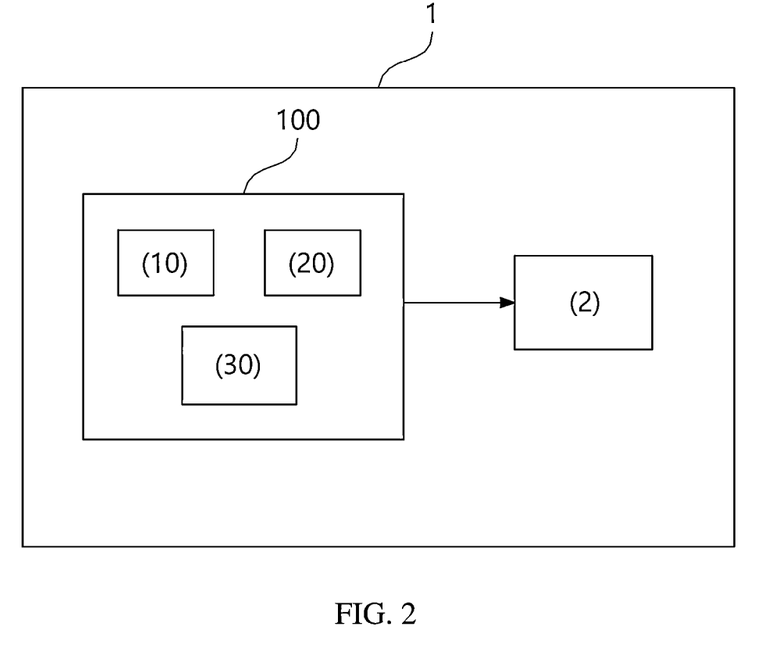
FIG. 2 is a diagram illustrating a control system of a wiper for a vehicle according to an exemplary form of the present disclosure.

FIG. 2 is a diagram illustrating a control system 100 of a wiper for a vehicle according to an exemplary form of the present disclosure.

Referring to FIG. 2, the control system 100 of the wiper for the vehicle includes a counter unit 10, a wiper motor unit 20, and a wiper motor control unit 30. In one form, the control system 100 may be provided in the vehicle 1.

The counter unit 10 may be configured to count parking times at the first parking position APP1 and the second parking position APP2 of the wiper 2.

The wiper motor unit 20 may operate the wiper 2 horizontally according to a control of the wiper motor control unit 30. In another form, the wiper motor unit 20 may be a unidirectional rotation motor which rotates only in one direction.

The wiper motor control unit 30 may control the operation of the wiper motor unit 20. In one form, the wiper motor control unit 30 is driven according to an ignition on signal from a power supply control unit (not illustrated) of the vehicle 1 and an on signal of a wiper switch (not illustrated) provided in the control system 100 to control the operation of the wiper motor unit 20.

In the exemplary form of the present disclosure, when the wiper 2 performs a wiping operation according to the operation of the wiper motor unit 20, the wiper 2 moves from the second parking position APP2 to the first parking position APP1 to be parked at the first parking position APP1.

Meanwhile, when the wiper 2 does not perform the wiping operation, since the wiper motor unit 20 is a motor which rotates only in one direction as described above, and as a result, when the wiper 2 is not wiped again, it may be impossible that the wiper 2 moves from the second parking position APP2 to the first parking position APP1.

When the wiper 2 does not perform the wiping operation and the wiper 2 is parked at the first parking position APP1, it may be possible that the wiper 2 moves from the first parking position APP1 to the second parking position APP2.

In this case, the wiper motor control unit 30 controls the wiper motor unit 20 to operate within a predetermined range (a range in which the wiper 2 may move from the first parking position APP1 to the second parking position APP2) to move the wiper 2 from the first parking position APP1 to the second parking position APP2.

Figure 3:
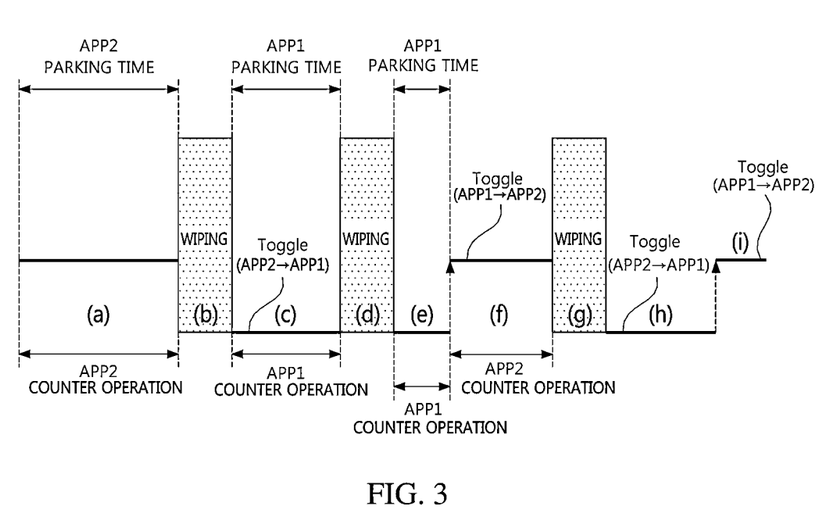
FIG. 3 is a diagram illustrating an operation mechanism of a wiper for a vehicle according to an exemplary form of the present disclosure.

FIG. 3 is a diagram exemplarily illustrating an operation mechanism of a wiper for a vehicle according to an exemplary form of the present disclosure. In this case, steps from (a) to (i) illustrated in FIG. 3 represent the wiping operation or a parking position change of the wiper 2 with the elapse of the time.

Referring to step (a) of FIG. 3, the counter unit 10 may count the parking time at the second parking position APP2 of the wiper 2 until the wiper 2 operates.

In the exemplary form of the present disclosure, when the vehicle 1 is in an ignition off state, the counter unit 10 may count even the parking time in the second parking position APP2 of the wiper 2 in the ignition off state of the vehicle 1.

While the vehicle 1 is in the ignition on state and the wiper switch is in an off state, the parking time at the second parking position APP2 of the wiper 2 may be counted.

Thereafter, referring to step (b) of FIG. 3, the wiper motor control unit 30 controls the wiper motor unit 20 to operate, and as a result, the wiper 2 operates to perform the wiping operation.

Next, after the wiping operation of the wiper 2 in step (b) of FIG. 3 is completed, as illustrated in step (c) of FIG. 3, the wiper motor control unit 30 may control the operation of the wiper motor unit 20 to be stopped and the wiper 2 to be parked at the first parking position APP1.

Referring to steps (c) and (e) of FIG. 3, the counter unit 10 may count the parking time at the first parking position APP1 of the wiper 2 after the operation of the wiper 2 in step (b) of FIG. 3 is completed.

In this case, in step (d) of FIG. 3 between steps (c) and (e) of FIG. 3, the wiper motor control unit 30 controls the wiper motor unit 20 to reoperate, and as a result, the wiper 2 is operated to perform the wiping operation.

According to the exemplary form of the present disclosure, the wiper motor control unit 30 may control the operation of the wiper motor unit 20 so that the parking position of the wiper 2 is designated according to the parking times at the first parking position APP1 and the second parking position APP2 counted by the counter unit 10.

In one form, the wiper motor control unit 30 controls the operation of the wiper motor unit 20 so that the parking time at the first parking position APP1 of the wiper 2 and the parking time at the second parking position APP2 are identical to designate the parking position of the wiper 2.

Specifically, in steps (c) and (e) of FIG. 3, when the parking time at the first parking position APP1 of the wiper 2 counted by the counter unit 10 does not exceed the parking time at the second parking position APP2, the wiper motor control unit 30 may control the operation of the wiper motor unit 20 so that the wiper 2 is parked at the first parking position APP1.

Specifically, in steps (c) and (e) of FIG. 3, when the parking time at the first parking position APP1 of the wiper 2 does not exceed the parking time at the second parking position APP2, the wiper 2 may maintain a parked state at the first parking position APP1 regardless of whether the wiping operation of the wiper 2 illustrated in FIG. 3(d) is performed.

Meanwhile, referring to step (f) of FIG. 3, when the parking time at the first parking position APP1 of the wiper 2 exceed the parking time at the second parking position APP2, the wiper motor control unit 30 may control the operation of the wiper motor unit 20 so that the wiper 2 is parked at the second parking position APP2.

According to the exemplary forms of the present disclosure, since the parking position of the wiper 2 is designated so that the parking times at the first parking position APP1 and the second parking position APP2 of the wiper 2 counted by the counter unit 10 are identical, the life-span of the wiper 2 can be extended by minimizing hardening of rubber provided in the wiper 2.

The operation mechanism of the wiper 2 described with reference to steps (a) to (f) of FIG. 3 may be similarly applied even to steps (g) to (i) of FIG. 3 after step (f).

Specifically, while the wiper 2 is parked at the second parking position APP2 as in step (f) of FIG. 3, the counter unit 10 may count the parking time at the second parking position APP2 of the wiper 2.

Next, as in step (g) of FIG. 3, the wiper motor control unit 30 controls the wiper motor unit 20 to reoperate, and as a result, the wiper 2 operates to perform the wiping operation.

After the wiping operation of the wiper 2 in step (g) of FIG. 3 is completed, as illustrated in part (h) of FIG. 3, the wiper motor control unit 30 may control the operation of the wiper motor unit 20 to be stopped and the wiper 2 to be parked at the first parking position APP1.

In this case, as in step (i) of FIG. 3, when the parking time at the first parking position APP1 of the wiper 2 exceeds the parking time at the second parking position APP2, the wiper motor control unit 30 may control the operation of the wiper motor unit 20 so that the wiper 2 is parked at the second parking position APP2.

Figure 4:
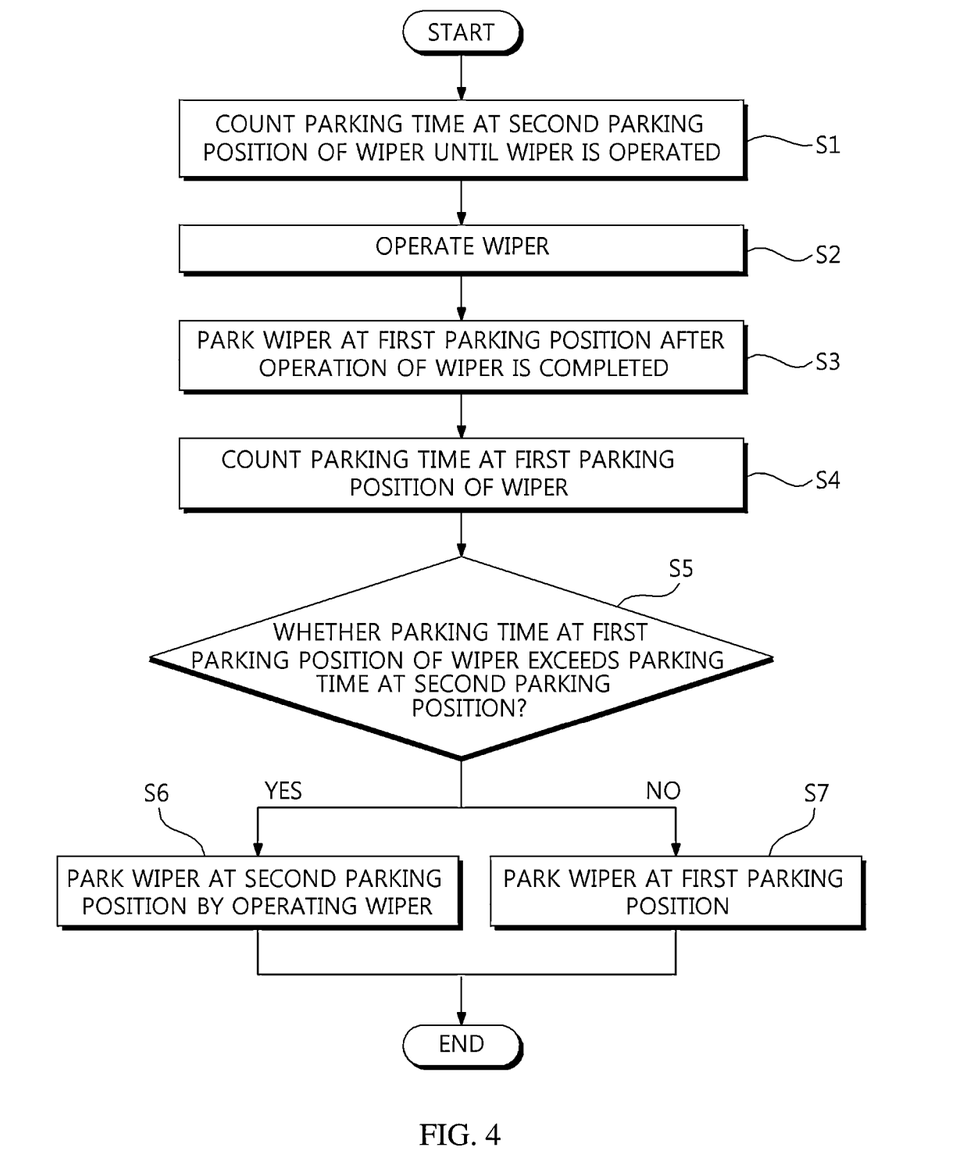
FIG. 4 is a flowchart illustrating a control method of a wiper for a vehicle according to an exemplary form of the present disclosure.

FIG. 4 is a flowchart illustrating a control method of a wiper for a vehicle according to an exemplary form of the present disclosure.

Referring to FIG. 4, the control method of the wiper for the vehicle is as follows.

First, parking times are counted at a first parking position APP1 and a second parking position APP2 of a wiper 2.

Specifically, in counting the parking times at the first parking position APP1 and the second parking position APP2 of the wiper 2, the parking time at the second parking position APP2 of the wiper 2 until the wiper 2 is operated is counted (step S1).

Next, the wiper 2 is operated (step S2).

After step S2 above, after the operation of the wiper 2 is completed, the wiper 2 is parked at the first parking position APP1 (step S3).

Next, the parking time at the first parking position APP1 of the wiper 2 is counted (step S4).

After step S4 above, it is checked whether the parking time at the first parking position APP1 of the wiper 2 exceeds the parking time at the second parking position APP2 (step S5).

After step S5 above, a parking position of the wiper 2 is designated according to whether the parking time at the first parking position APP1 of the wiper 2 exceeds the parking time at the second parking position APP2.

Specifically, in step S5 above, when the parking time at the first parking position APP1 of the wiper 2 exceeds the parking time at the second parking position APP2, the wiper 2 is parked at the second parking position APP2 by operating the wiper 2 (step S6).

Meanwhile, in step S5 above, when the parking time at the first parking position APP1 of the wiper 2 does not exceed the parking time at the second parking position APP2, the wiper 2 is parked at the first parking position APP1 (step S7).

In another form, in designating the parking position of the wiper 2, the parking position of the wiper 2 may be designated so that the parking time at the first parking position APP1 of the wiper 2 and the parking time at the second parking position APP2 are identical.

The above description just illustrates the technical spirit of the present disclosure and various changes, modifications, and substitutions can be made by those having ordinary skill in the art to which the present disclosure pertains without departing from principles of the present disclosure. Therefore, the exemplary forms and the accompanying drawings disclosed in the present disclosure are used to not limit but describe the technical spirit of the present disclosure and the scope of the technical spirit of the present disclosure is not limited by the exemplary forms and the accompanying drawings. All the technical concepts in the equivalent scope thereof should be construed as falling within the scope of the present disclosure.

As described above, the exemplary forms have been described and illustrated in the drawings and the specification. The exemplary forms were chosen and described in order to explain certain principles of the present disclosure and their practical application, to thereby enable others having ordinary skill in the art to make and utilize various exemplary forms of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those having ordinary skill in the art. Many changes, modifications, variations and other uses and applications of the present construction will, however, become apparent to those having ordinary skill in the art after considering the specification and the accompanying drawings. All such changes, modifications, variations and other uses and applications which do not depart from the spirit and scope of the present disclosure are deemed to be covered by the present disclosure.

What is claimed is:

1. A control method of a wiper for a vehicle, the control method comprising:
    counting a first period of parking time parking times at a first parking position of the wiper and a second period of parking time at a second parking position of the wiper;
    determining whether the first period of parking time at the first parking position of the wiper exceeds the second period of parking time at the second parking position;
    designating a parking position of the wiper to the first parking position or the second parking position according to whether the first period of parking time at the first parking position of the wiper exceeds the second period of parking time at the second parking position;
    wherein the wiper is a unidirectional driving wiper; and
    wherein counting the first period of parking time at the first parking position and the second period of parking time at the second parking position of the wiper includes:
        counting the second period of parking time at the second parking position of the wiper until the wiper is operated, and operating the wiper.

2. The control method of claim 1, wherein counting the first period of parking time at the first parking position and the second period of parking time at the second parking position of the wiper further includes:
    parking the wiper at the first parking position after the operation of the wiper is completed, and
    counting the first period of parking time at the first parking position of the wiper.

3. The control method of claim 2, wherein designating the parking position of the wiper includes:
    parking the wiper at the second parking position by operating the wiper when the first period of parking time at the first parking position of the wiper exceeds the second period of parking time at the second parking position.

4. The control method of claim 2, wherein designating the parking position of the wiper includes:
    parking the wiper at the first parking position when the first period of parking time at the first parking position of the wiper does not exceed the second period of parking time at the second parking position.

5. The control method of claim 1, wherein in designating the parking position of the wiper, the parking position of the wiper is designated so that the first period of parking time at the first parking position of the wiper and the second period of parking time at the second parking position are identical.

6. The control method of claim 1, wherein:
    when the wiper performs a wiping operation, the wiper is movable from the second parking position to the first parking position, and
    when the wiper does not perform the wiping operation, the wiper does not move from the second parking position to the first parking position.

7. The control method of claim 6, wherein when the wiper does not perform the wiping operation and the wiper is parked at the first parking position, the wiper is movable from the first parking position to the second parking position.

8. A control system of a wiper for a vehicle, the control system comprising:
    a counter unit configured to count a first period of parking time at a first parking position and a second period of parking time at a second parking position of the wiper;
    a wiper motor unit configured to operate the wiper; and
    a wiper motor control unit configured to:
    control the operation of the wiper motor unit,
    compare the first period of parking time with the second period of parking time, and
    designate a parking position of the wiper to the first parking position or the second parking position based on a result of comparing the first period of parking time with the second period of parking time;
    wherein the wiper motor unit is a unidirectional rotation motor which rotates only in one direction;
    wherein the counter unit is configured to count the second period of parking time at the second parking position of the wiper until the wiper is operated and the first period of parking time at the first parking position of the wiper after the operation of the wiper is completed.

9. The control system of claim 8, wherein the wiper motor control unit is configured to control the operation of the wiper motor unit so as to park the wiper at the second parking position when the first period of parking time at the first parking position of the wiper exceeds the second period of parking time at the second parking position.

10. The control system of claim 8, wherein the wiper motor control unit is configured to control the operation of the wiper motor unit so as to park the wiper at the first parking position when the first period of parking time at the first parking position of the wiper does not exceed the second period of parking time at the second parking position.

11. The control system of claim 8, wherein the wiper motor control unit is configured to designate the parking position of the wiper by controlling the operation of the wiper motor unit so that the first period of parking time at the first parking position of the wiper and the second period of parking time at the second parking position are identical.

12. The control system of claim 8, wherein when the wiper performs a wiping operation, the wiper is movable from the second parking position to the first parking position, and when the wiper does not perform the wiping operation, the wiper does not move from the second parking position to the first parking position.

13. The control system of claim 12, wherein when the wiper does not perform the wiping operation and the wiper is parked at the first parking position, the wiper is movable from the first parking position to the second parking position according to the control of the wiper motor control unit.

* * * * *

UNITED STATES PATENT AND TRADEMARK OFFICE
CERTIFICATE OF CORRECTION

PATENT NO. : 12,060,040 B2
APPLICATION NO. : 17/534024
DATED : August 13, 2024
INVENTOR(S) : Kyung Soo Ryu It is certified that error appears in the above-identified patent and that said Letters Patent is hereby corrected as shown below:

In the Claims

Claim 1, Column 7, Line 51:
"counting a first period of parking time parking times at a"
Should be replaced with:
--counting a first period of parking time at a--

Signed and Sealed this
Twenty-ninth Day of October, 2024

Katherine Kelly Vidal
*Director of the United States Patent and Trademark Office*